United States Patent
Delegard et al.

(10) Patent No.: US 12,302,034 B1
(45) Date of Patent: May 13, 2025

(54) SELECTIVE RECORDING OF SENSOR DATA WITHIN A SYSTEM GATEWAY

(71) Applicant: Samsara Inc., San Francisco, CA (US)

(72) Inventors: Justin Joel Delegard, West Chester, OH (US); Sabrina Quinn Shemet, Felton, CA (US); Justin Pan, Cupertino, CA (US); Mathew Calmer, Sacramento, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/647,798

(22) Filed: Jan. 12, 2022

Related U.S. Application Data (63) Continuation of application No. 17/304,532, filed on Jun. 22, 2021, now abandoned.

(51) Int. Cl.
*H04N 5/77* (2006.01)
*H04L 12/66* (2006.01)
*H04N 5/265* (2006.01)
*H04N 7/18* (2006.01)

(52) U.S. Cl.
CPC .............. *H04N 5/77* (2013.01); *H04L 12/66* (2013.01); *H04N 5/265* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 4,974,092 A | * | 11/1990 | Kawamura | H04N 5/232123 |
| | | | | 348/E5.045 |
| 7,483,618 B1 | * | 1/2009 | Edwards | G11B 27/034 |
| | | | | 386/278 |
| 8,505,042 B2 | * | 8/2013 | Conklin | H04N 21/6582 |
| | | | | 725/18 |
| 10,300,888 B1 | * | 5/2019 | Gilbert-Eyres | H04N 7/185 |
| 2002/0154885 A1 | * | 10/2002 | Covell | G11B 27/024 |
| | | | | 386/300 |
| 2005/0225685 A1 | * | 10/2005 | Kim | H04N 5/50 |
| | | | | 348/E5.112 |
| 2007/0019311 A1 | * | 1/2007 | Stricek | G03B 37/04 |
| | | | | 359/864 |
| 2007/0171928 A1 | * | 7/2007 | Kim | H04L 47/12 |
| | | | | 370/535 |

(Continued)

OTHER PUBLICATIONS

U.S. Appl. No. 17/304,532, filed Jun. 22, 2021, Selective Recording of Sensor Data Within a System Gateway.

(Continued)

*Primary Examiner* — Gelek W Topgyal
(74) *Attorney, Agent, or Firm* — Schwegman Lundberg & Woessner, P.A.

(57) ABSTRACT

A selective recording system to perform operations that include: accessing, at a system gateway, a data stream generated by a sensor device; determining a property of a portion of the data stream at the system gateway, the property of the portion of the data stream comprising a value; determining that the value of the property of the portion of the data stream transgresses a threshold value; and recording the portion of the data stream within a database of the system gateway in response to the determining that the property of the portion of the data stream transgresses the threshold value.

17 Claims, 7 Drawing Sheets

(56) References Cited

U.S. PATENT DOCUMENTS

| | | | |
|---|---|---|---|
| 2011/0184964 A1* | 7/2011 | Li | G06F 16/40 |
| | | | 707/756 |
| 2011/0205943 A1* | 8/2011 | Grimm | H04L 1/0003 |
| | | | 370/310 |
| 2016/0292881 A1* | 10/2016 | Bose | G11B 27/10 |
| 2016/0337718 A1* | 11/2016 | Talbott | H04N 21/6582 |
| 2018/0048850 A1* | 2/2018 | Bostick | G06V 20/56 |
| 2019/0158625 A1* | 5/2019 | Papageorgiou | H04L 12/66 |
| 2019/0200013 A1* | 6/2019 | Wu | H04N 19/164 |
| 2019/0378279 A1* | 12/2019 | Hirakawa | H04N 7/18 |
| 2021/0021833 A1* | 1/2021 | Hong | H04N 19/137 |

OTHER PUBLICATIONS

"U.S. Appl. No. 17/304,532, Non Final Office Action mailed Dec. 16, 2021", 10 pages.

* cited by examiner

```
┌─────────────────────────────────────────────────────────────┐
│ DETERMINING THAT THE PROPERTY OF A SECOND PORTION OF THE    │
│        DATA STREAM IS BELOW THE THRESHOLD VALUE             │
│                           402                                │
└─────────────────────────────────────────────────────────────┘
                              │
                              ▼
┌─────────────────────────────────────────────────────────────┐
│ ERASING THE SECOND PORTION OF THE DATA STREAM FROM THE DATA │
│  STREAM BASED ON THE DETERMINING THAT THE PROPERTY OF THE   │
│ SECOND PORTION OF THE DATA STREAM IS BELOW THE THRESHOLD    │
│                           VALUE                              │
│                           404                                │
└─────────────────────────────────────────────────────────────┘
```

SELECTIVE RECORDING OF SENSOR DATA WITHIN A SYSTEM GATEWAY

PRIORITY APPLICATION

This application is a continuation of U.S. patent application Ser. No. 17/304,532, filed Jun. 22, 2021, the disclosure of which is incorporated by reference herein in its entirety

TECHNICAL FIELD

Embodiments of the present disclosure relate generally the field of system gateways, and more particularly, but not by way of limitation, to a system for integrating an auxiliary sensor into a system gateway.

BACKGROUND

A gateway is a piece of networking hardware used in telecommunications for telecommunications networks that allows data to flow from one discrete network to another. Gateways are distinct from routers or switches in that they communicate using more than one protocol to connect a bunch of network and can operate at any of the seven layers of the open systems interconnection model (OSI).

Accordingly, a network gateway provides interoperability between networks and contains devices, such as protocol translators, impedance matchers, rate converters, fault isolators, or signal translators. A network gateway requires the establishment of mutually acceptable administrative procedures between the networks using the gateway. Network gateways, known as protocol translation gateways or mapping gateways, can perform protocol conversions to connect networks with different network protocol technologies.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As discussed above, a network gateway provides interoperability between networks and may be interfaced with devices. For example, according to certain embodiments of a fleet management system, a system gateway may be integrated within the fleet management system to provide operability to monitor vehicle telematics, as well as data generated by one or more sensor devices. For example, a plurality of cameras may be coupled with the network gateway of the fleet management system, such that video data generated by the plurality of cameras may be recorded at a database associated with the fleet management system.

In some embodiments, one or more of the cameras from among the plurality of cameras may be configured to activate responsive to detecting a trigger event or receiving an input. For example, one or more of the cameras may include a backup camera (also called a reversing camera or rear-view camera), wherein the backup camera is a special type of video camera that is produced specifically for the purpose of being attached to the rear of a vehicle to aid in backing up, and to alleviate the rear blind spot. It is specifically designed to avoid a backup collision. Accordingly, in certain embodiments, the backup camera may be configured to activate upon determining that a vehicle associated with the backup camera has been put in reverse, begins to move backwards, or detects a rear-end collision.

The data generated by the plurality of cameras may be routed to the system gateway to be indexed and stored. As discussed above, there are certain situations where a sensor device may only generate valid data responsive to detecting certain events or conditions. In such situations, an issue that may arise is that data captured by the sensor device upon activation is buried in a static analog signal. For example, an analog to digital converter in communication with an analog camera may generate a static analog signal (e.g., a blue screen) due to a lack of a valid analog signal generated by the camera, while the camera remains inactive. When such data is presented to a user, the user may therefore need to scan through a significant amount of static analog signal data (potentially hours of time) to identify a portion of the data that includes actual video (or other data) which is generated by the camera (i.e., the sensor device).

According to certain example embodiments, a selective recording system is configured to perform operations that include: accessing, at a system gateway, a data stream generated by a sensor device; determining a property of a portion of the data stream at the system gateway, the property of the portion of the data stream comprising a value; determining that the value of the property of the portion of the data stream transgresses a threshold value; and recording the portion of the data stream within a database of the system gateway in response to the determining that the property of the portion of the data stream transgresses the threshold value.

In some embodiments, the threshold value may define a minimum data size of a portion of a data stream. Accordingly, responsive to determining that a data packet from a data stream transgresses the threshold value (i.e., the data packet is above a certain size), the selective recording system may record the portion of the data stream within a database. For example, the threshold value may be defined based on a size of a data packet of the static analog data signal, such that the system may filter out such data, to only record data captured by the corresponding sensor device. Similarly, responsive to determining that the data packet is below the threshold value, the selective recording system may simply erase the portion of the data stream.

In some embodiments, the selective recording system may be configured to generate a composite data stream based on portions of data streams generated by a plurality of sensor devices. For example, the portions of data streams may include those portions of data streams that transgress the threshold value. Accordingly, the selective recording system may assemble the portions based on corresponding timestamp data. In such embodiments, the selective recording system may generate and cause display of a specially configured graphical user interface (GUI) to display the composite data stream.

Figure 1:
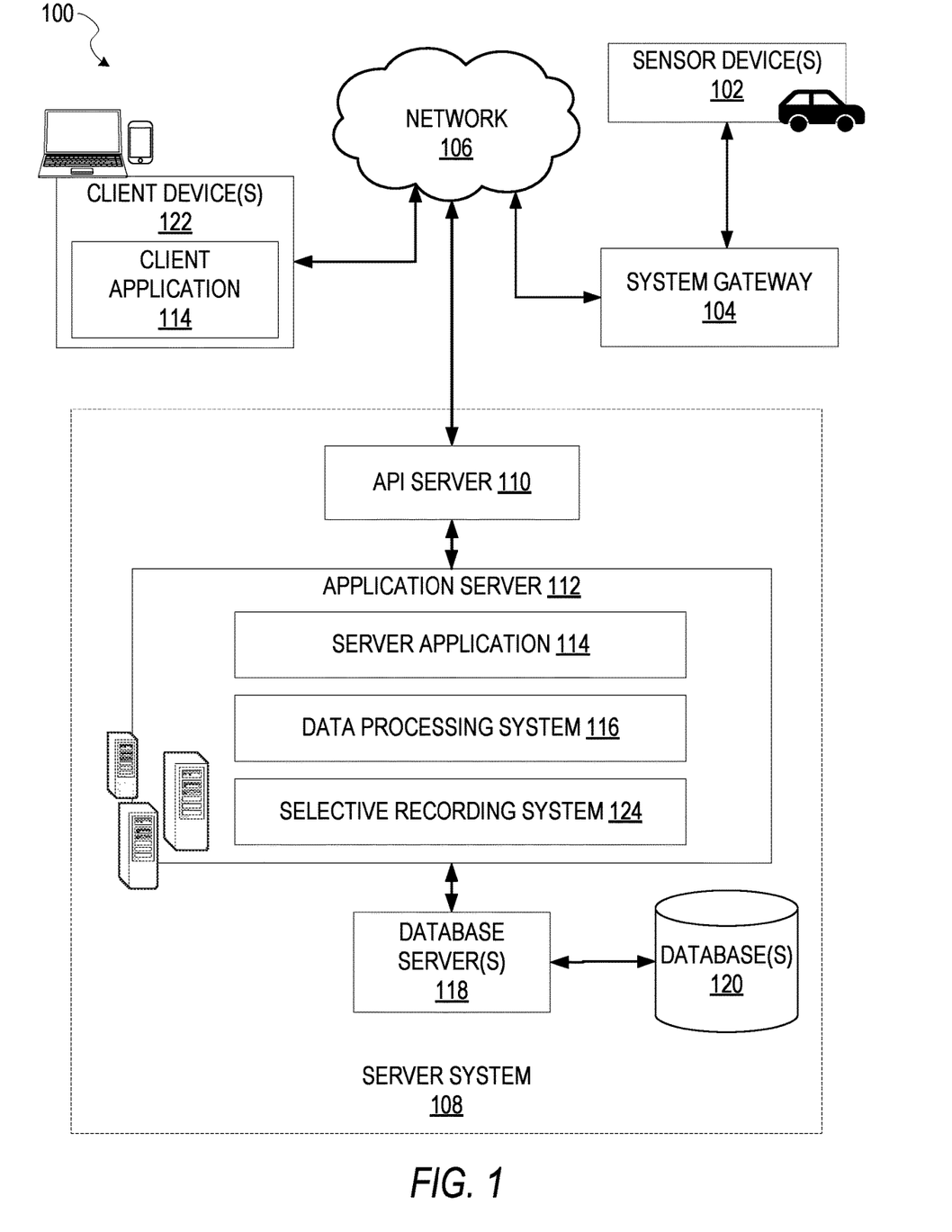
FIG. 1 is a block diagram showing an example system for exchanging data (e.g., sensor data and associated content) over a network in accordance with some embodiments, wherein the system includes a selective recording system.

FIG. 1 is a block diagram showing an example system 100 for selectively recording portions of a data stream, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device 102 and the system gateway 104. While certain functions of the system 100 are described herein as being performed by either a client application 114, the sensor device 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device 102, or system gateway 104, where there may be sufficient processing capacity.

The server system 108 supports various services and operations that are provided to the client application 114. Such operations include transmitting data to, receiving data from, and processing data generated by the client application 114, the sensor devices 102, and the system gateway 104. In some embodiments, the sensor devices 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor device 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a selective recording system 124. The selective recording system 124 is configured to perform operations that include: accessing, at a system gateway, a data stream generated by a sensor device; determining a property of a portion of the data stream at the system gateway, the property of the portion of the data stream comprising a value; determining that the value of the property of the portion of the data stream transgresses a threshold value; and recording the portion of the data stream within a database of the system gateway in response to the determining that the property of the portion of the data stream transgresses the threshold value, according to some example embodiments. Further details of the selective recording system 124 can be found in FIG. 2 below.

The server application 114 implements a number of data processing technologies and functions, particularly related to the aggregation and other processing of data (e.g., sensor data generated by the sensor device 102). As will be described in further detail, the sensor data, including odometer data points and GPS data points, generated by the sensor device 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor device 102 and processed by the server application 114.

Figure 2:
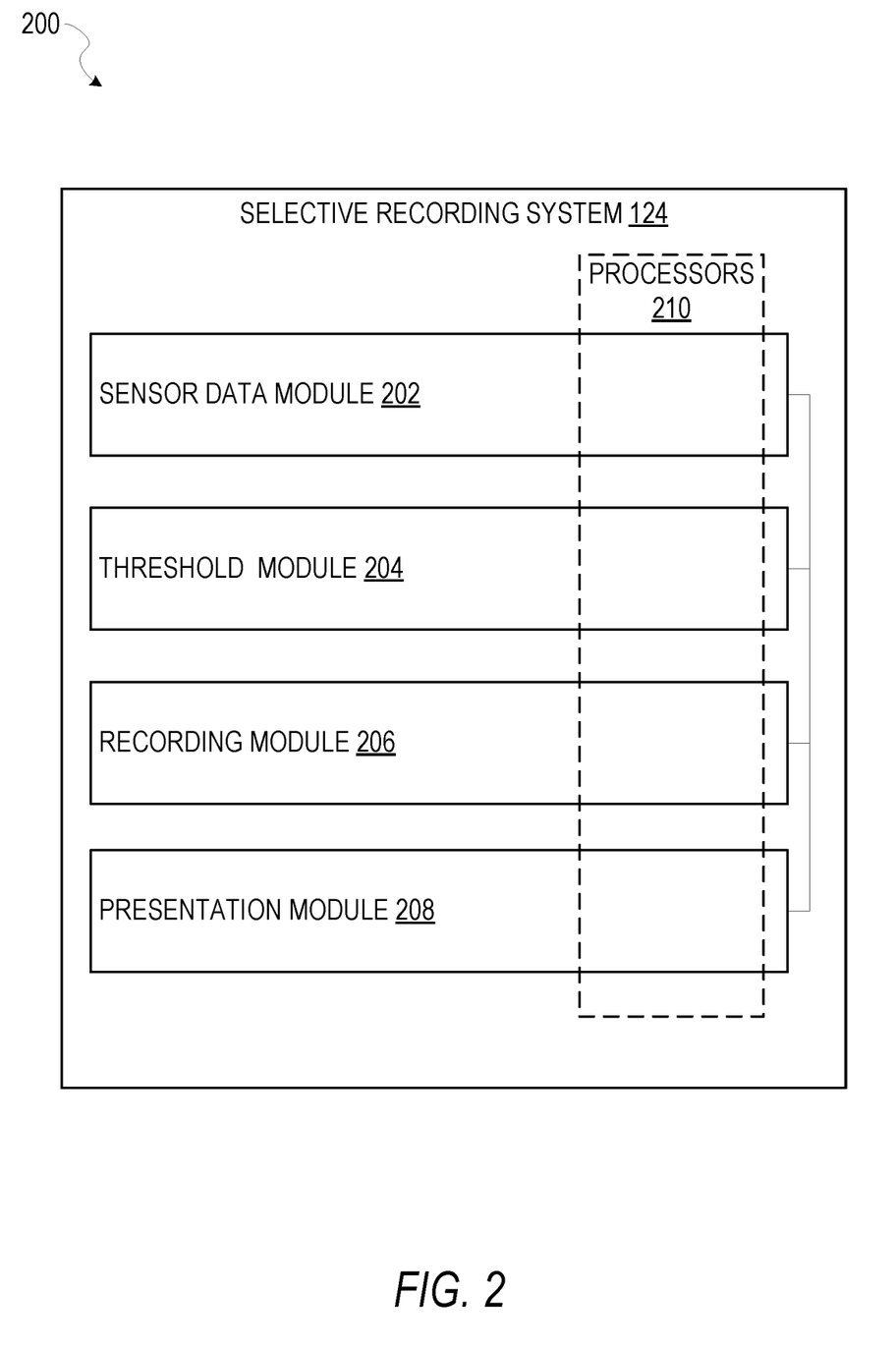
FIG. 2 is a block diagram illustrating various modules of an integration system, according to certain example embodiments.

FIG. 2 is a block diagram 200 illustrating components of the selective recording system 124 that configure the selective recording system 124 to perform operations to selectively record portions of a data stream generated by a sensor device, according to some example embodiments.

The selective recording system 124 is shown as including a sensor data module 202, a threshold module 204, a recording module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the analytics reporting system 124 may physically include an arrangement of one or more of the processors 210 (e.g., a subset of or among the one or more processors of the machine) configured to perform the operations described herein for that module. As another example, any module of the analytics reporting system 124 may include software, hardware, or both, that configure an arrangement of one or more processors 210 (e.g., among the one or more processors of the machine) to perform the operations described herein for that module. Accordingly, different modules of the analytics reporting system 124 may include and configure different arrangements of such processors 210 or a single arrangement of such processors 210 at different points in time. Moreover, any two or more modules of the analytics reporting system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
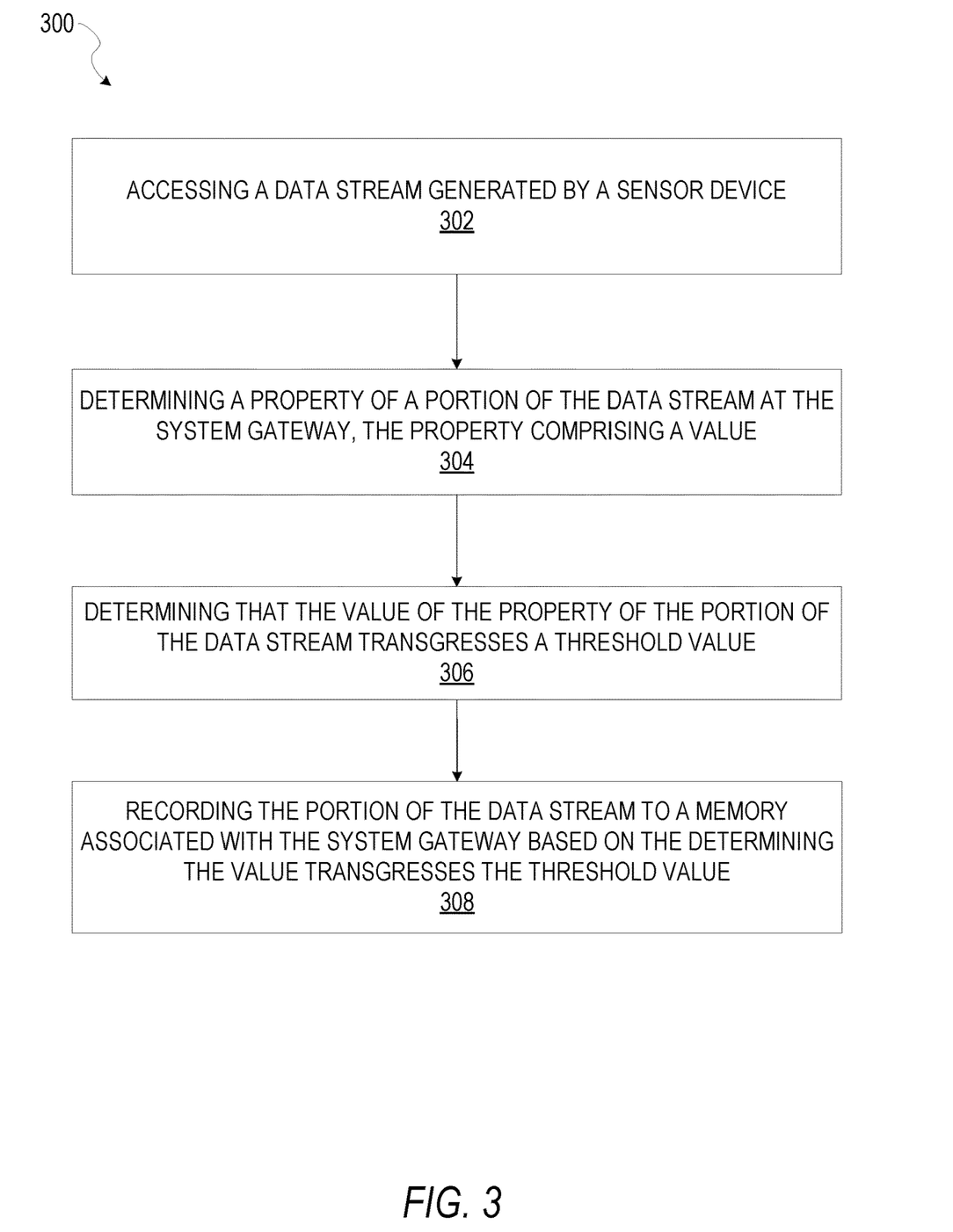
FIG. 3 is a flowchart depicting a method of selectively recording portions of a data stream, according to certain example embodiments.

FIG. 3 is a flowchart depicting a method 300 of selectively recording a portion of a data stream generated by a sensor device, according to certain example embodiments. Operations of the method 300 may be performed by the modules described above with respect to FIG. 2. As shown in FIG. 3, the method 300 includes one or more operations 302, 304, 306, and 308.

At operation 302, the sensor data module 202 accesses a data stream generated by one or more sensor devices 102. For example, the sensor device 102 may include a camera integrated into a vehicle, such as a rear-facing (i.e., backup) camera, wherein the camera may generate an analog signal.

At operation 304, the threshold module 204 determines a property of a portion of the data stream generated by the sensor device 102, wherein the property includes a data packet size. In some embodiments, the property may comprise one or more attributes, such as video or audio data attributes. For example, the attributes may include the presence of certain video features or audio features within the data stream.

At operation 306, the threshold module 204 determines that the property of the portion of the data stream generated by the sensor device 102 transgresses a threshold value. In some embodiments, the threshold value may be set based on properties of a static signal generated by the sensor device 102. For example, the threshold module 204 may determine that the data packet size of the portion of the data stream generated by the sensor device 102 is larger than a minimum value defined by the threshold.

At operation 308, responsive to the threshold module 204 determining that the property of the portion of the data stream transgresses the threshold value, the recording module 206 records the portion of the data stream. In some embodiments, recording the portion of the data stream may include the steps of causing the system gateway 104 to transmit the portion of the data stream to a database, such as the database 120. In some embodiments, recording the portion of the data stream may include recording the portion of the data stream within a memory associated with the selective recording system 124, wherein the memory may be hosted locally to the sensor device 102, or at a server system 108.

Figure 4:
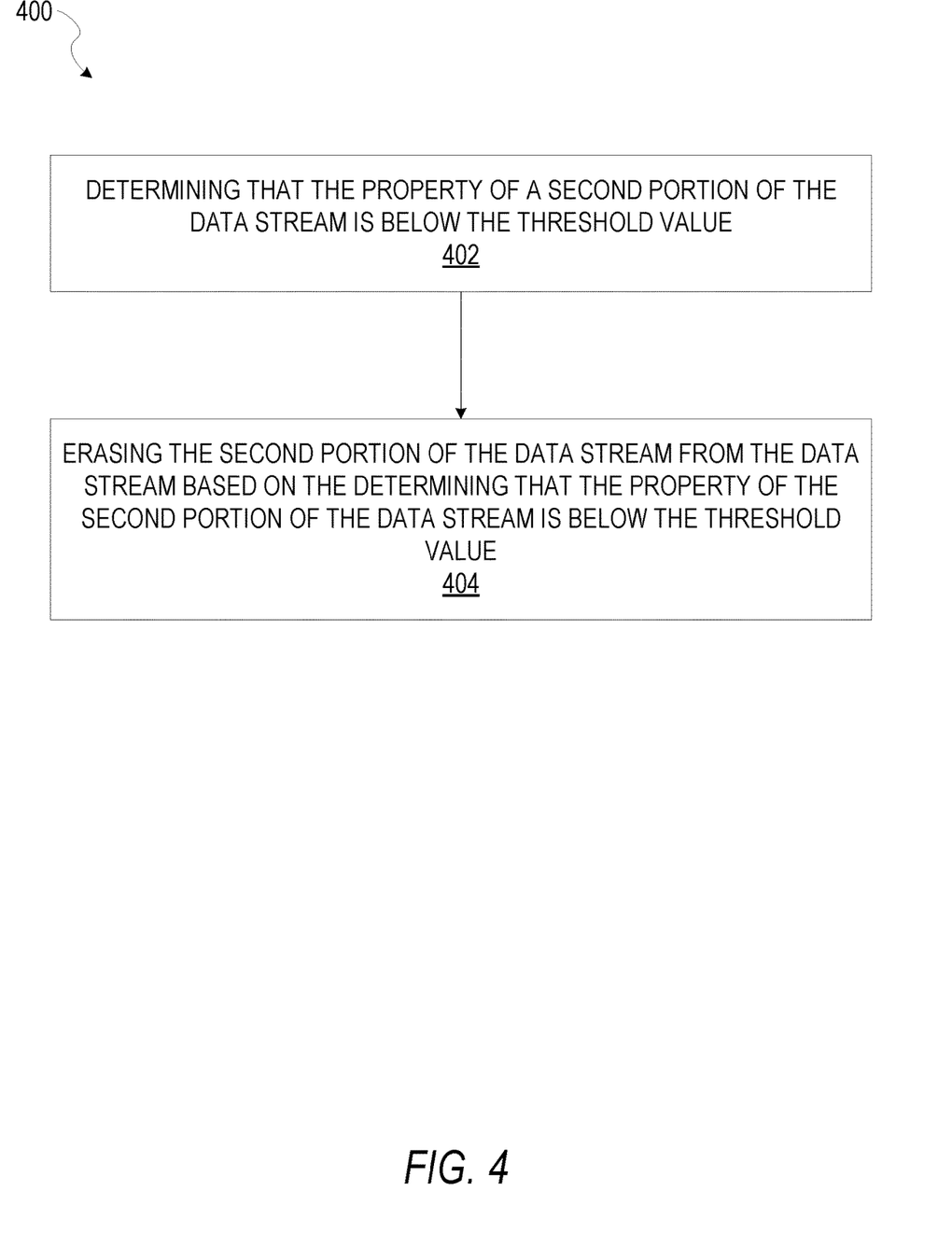
FIG. 4 is a flowchart depicting a method of selectively recording portions of a data stream, according to certain example embodiments.

FIG. 4 is a flowchart depicting a method 400 of selectively recording portions of a data stream, according to certain example embodiments. Operations of the method 400 may be performed by the modules described above with respect to FIG. 2. In some embodiments, the method 400 may be performed as a subroutine of one or more operations of the method 300, such as operation 306. As shown in FIG. 4, the method 400 includes one or more operations 402, and 404.

At operation 402, the threshold module 204 determines that the property of a second portion of the data stream is below the threshold value. As discussed above, the property of the portion (i.e., the second portion) of the data stream may include a data packet size.

At operation 404, responsive to the threshold module 204 determining that the property of the second portion of the data stream is below the threshold value, the recording module 206 bypasses operation 308 of the method 300, and does not record the second portion of the data stream. In some embodiments, the data stream may be recorded to a rolling buffer for a temporary period until properties of the data stream can be determined and compared to the threshold values. Upon determining that the property of the second portion of the data stream is below the threshold value, the recording module 206 may erase the second portion of the data stream, for example from the rolling buffer.

Figure 5:
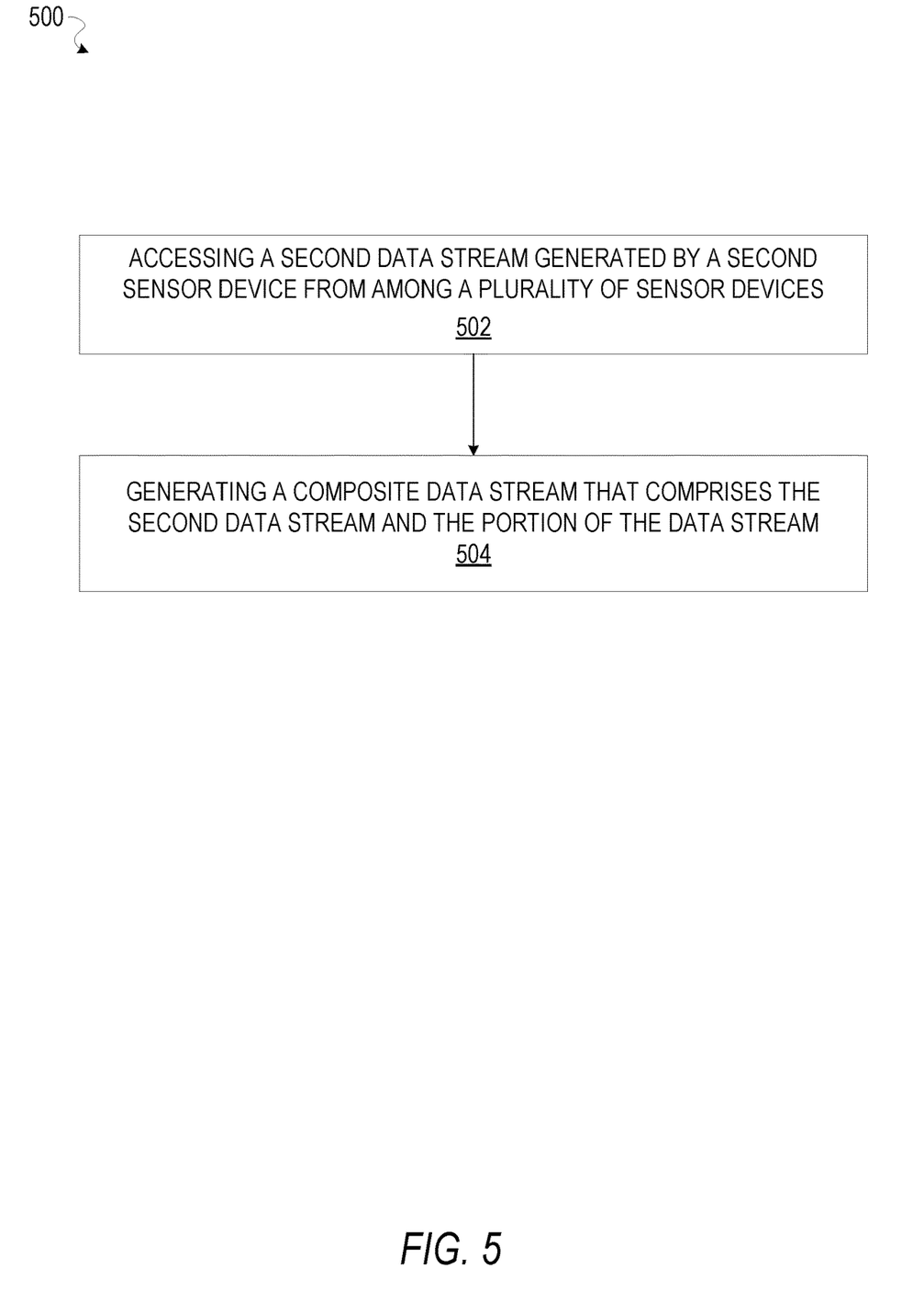
FIG. 5 is a flowchart depicting a method of generating a composite data stream, according to certain example embodiments.

FIG. 5 is a flowchart depicting a method 500 of generating a presentation of a composite data stream, according to certain example embodiments. Operations of the method 500 may be performed by the modules described above with respect to FIG. 2. In some embodiments, the method 500 may be performed as a subroutine of one or more operations of the methods 300 and 400, such as operation 308 of the method 300, and operation 404 of the method 400. As shown in FIG. 5, the method 500 includes one or more operations 502, and 504.

At operation 502, the sensor data module 202 accesses a second data stream generated by a second sensor device from among a plurality of sensor devices (i.e., the sensor devices 102). The second sensor device may for example include a camera.

In some embodiments, the data streams generated by the plurality of sensor devices may include timestamp data, such that the data streams may be temporally aligned based on the corresponding timestamp data. As an illustrative example, a first portion of a first data stream generated by a first camera may be temporally aligned with a second portion of a second data stream generated by a second camera based on the corresponding timestamp data.

At operation 504, the presentation module 208 generates a composite data stream that comprises the second data stream and the portion of the data stream discussed in the method 300. For example, the presentation module 208 may assemble the composite data stream based on the timestamp data corresponding with the portion of the data stream and the second data stream.

Figure 6:
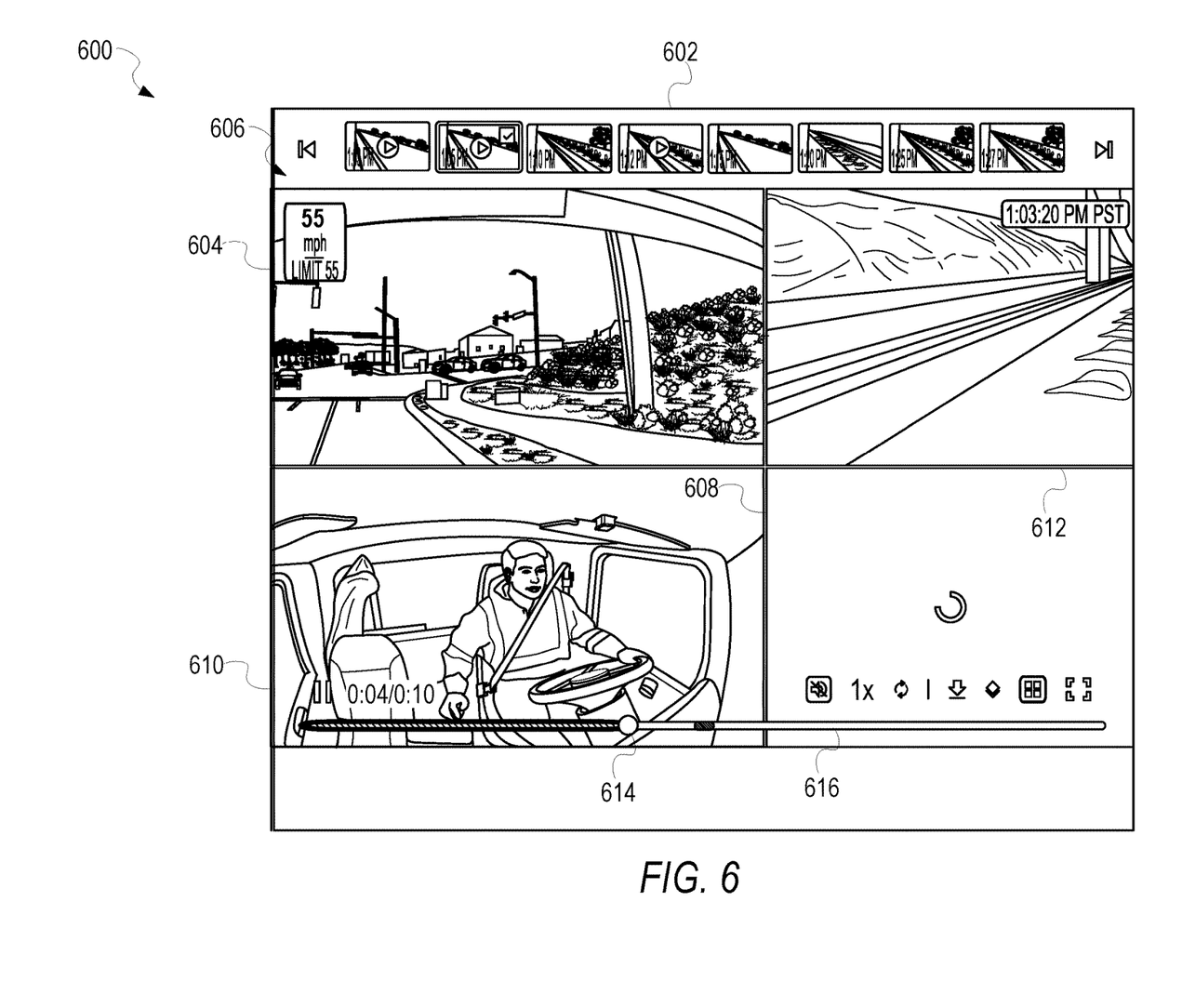
FIG. 6 is an interface diagram depicting a graphical user interface that presents a plurality of data streams, according to certain example embodiments.
Figure 7:
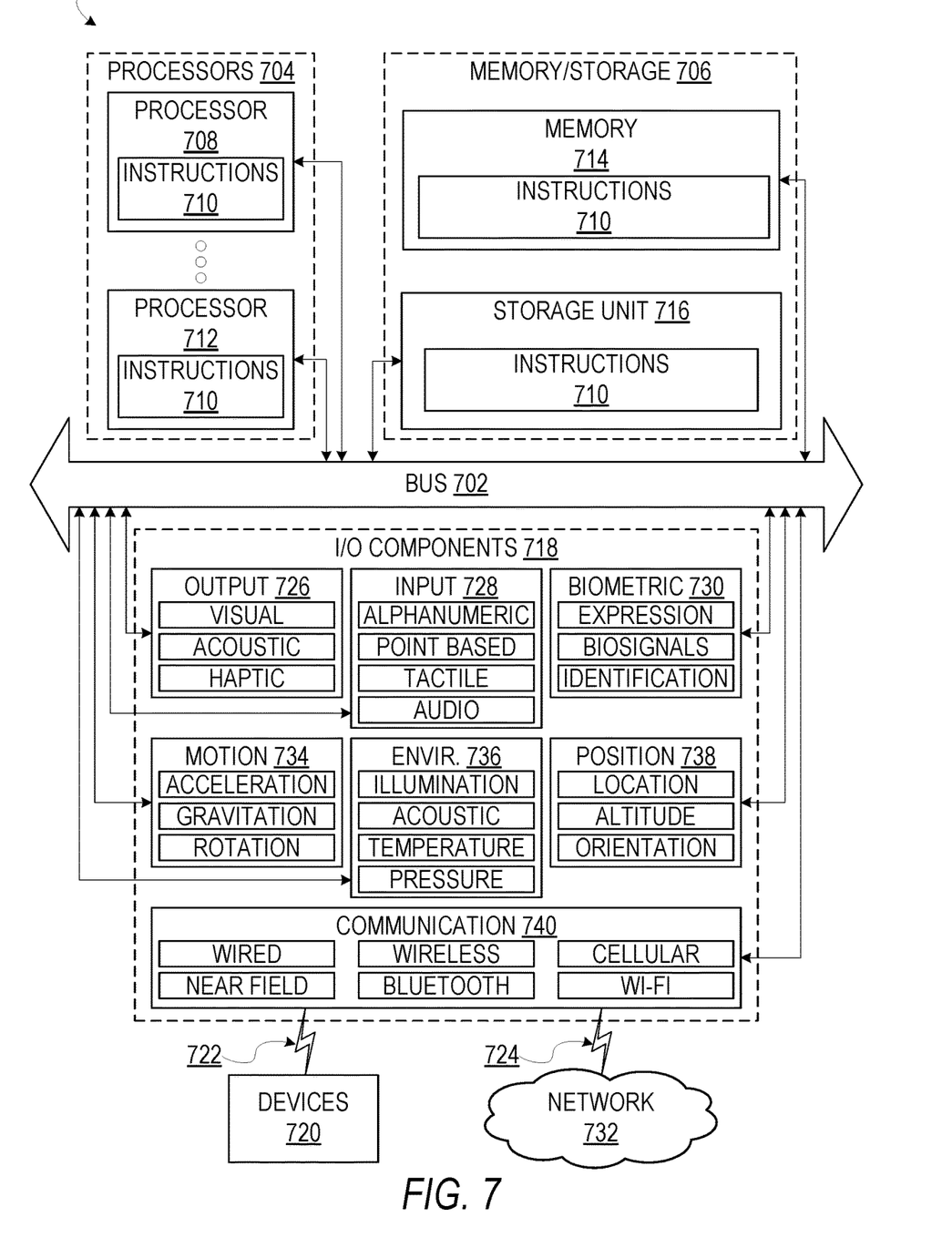
FIG. 7 is a block diagram illustrating components of a machine, according to some example embodiments, able to read instructions from a machine-readable medium (e.g., a machine-readable storage medium) and perform any one or more of the methodologies discussed herein.

In some embodiments, generating the composite data stream may include generating a GUI that comprises a presentation of the plurality of data streams, as depicted in the interface diagram 600 of FIG. 6, and the interface diagram 700 of FIG. 7.

FIG. 6 is an interface diagram 600 depicting a GUI 602 to display a composite data stream 606, wherein the composite data stream 606 comprises a display of one or more data streams generated by one or more sensor devices (i.e., the sensor devices 102), according to certain example embodiments. As seen in the interface diagram 600, the composite data stream 606 may comprise a display of a plurality of data streams, such as the presentations of the data streams 604, 608, 610, and 612 within separate regions of the GUI 602, wherein the presentations of the plurality of data streams may be controlled simultaneously via a common control element 614. For example, by moving the control element 614 along the axis 616, a user may track through the presentations of the plurality of data streams 604, 608, 610, and 612 simultaneously.

As discussed above, in certain embodiments, the selective recording system 124 is configured to erase (or record) portions of a data stream based upon attributes of the portions of the data stream (i.e., a size of the portion of the data stream, attributes of the portion of the data stream, etc.). As a result, the resulting data stream may contain missing sections where the erased portions were once located. Accordingly, in such embodiments, the selective recording system 124 may be configured to display a predefined placeholder screen within the GUI 606, as depicted in the presentation of the data stream 608.

As an illustrative example, the presentation of the data stream 608 may correspond with a rear facing camera integrated into a vehicle, wherein the rear facing camera is configured to activate upon detecting that the vehicle has been put into reverse, or upon detecting some rearward facing event based on other sensor devices integrated into the vehicle. Accordingly, while the camera is powered on, a portion of the data stream generated by the camera may comprise a static analog signal (e.g., a blue screen). Saving a recording of the static analog signal would be unnecessary and would waste valuable memory, so the selective recording system 124 purges the portion of the data stream based on an attribute of the portion of the data stream. By doing so, the resulting data stream would contain a gap where the portion of the data stream once was. In such embodiments, rather than simply presenting a blank screen, the selective recording system 124 may display a predefined placeholder screen, as depicted in the presentation of the data stream 608 of the interface diagram 600.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700.

Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
accessing, at a system gateway implemented within a vehicle, a data stream generated by an optical sensor device implemented within the vehicle;
recording the data stream within a rolling buffer;
determining a size of data packets included in a portion of the data stream recorded at the rolling buffer;
determining that the size of the data packets included in the portion of the data stream is greater than a threshold value associated with the optical sensor device, the threshold value comprising a minimum data size of the data packets included in the portion of the data stream, the minimum data size based on a static analog data signal generated by the optical sensor; and
in response to the determining that the size of the data packets included in the portion of the data stream recorded within the rolling buffer is greater than the minimum data size defined by the threshold value, transmitting the portion of the data stream from the rolling buffer to a database of the system gateway.

2. The method of claim 1, wherein the optical sensor device includes a camera, and the data stream comprises video data.

3. The method of claim 1, wherein the data stream comprises analog data, and the method further comprises:
converting the analog data of the data stream to digital data; and
determining the size of the data packets based on the digital data.

4. The method of claim 1, wherein the portion of the data stream is a first portion, and the method further comprises:
determining that a size of data packets included in a second portion of the data stream is below the threshold value; and
erasing the second portion of the data stream in response to the determining that the size of data packets included in the second portion of the data stream is below the threshold value.

5. The method of claim 1, wherein the optical sensor device is a first sensor device among a plurality of sensor devices, the data stream is a first data stream, and the method further comprises:
accessing a second data stream generated by a second sensor device from among the plurality of sensor devices; and
generating a composite data stream that comprises the second data stream and the portion of the first data stream.

6. The method of claim 5, wherein the portion of the data stream comprises a timestamp, and the generating the composite data stream includes:
generating a presentation of the composite data stream that comprises the second data stream, and the portion of the first data stream at a position along the composite data stream based on the timestamp.

7. A system gateway implemented within a vehicle, the system gateway comprising:
at least one hardware processor; and
a memory storing instructions that, when executed by the at least one hardware processor, cause the system gateway to perform operations comprising:
accessing, at a system gateway implemented within a vehicle, a data stream generated by an optical sensor device implemented within the vehicle;
recording the data stream within a rolling buffer;
determining a size of data packets included in a portion of the data stream recorded at the rolling buffer;
determining that the size of the data packets included in the portion of the data stream is greater than a threshold value associated with the optical sensor device, the threshold value comprising a minimum data size of the data packets included in the portion of the data stream, the minimum data size based on a static analog data signal generated by the optical sensor; and
in response to the determining that the size of the data packets included in the portion of the data stream recorded within the rolling buffer is greater than the minimum data size defined by the threshold value, transmitting the portion of the data stream from the rolling buffer to a database of the system gateway.

8. The system gateway of claim 7, wherein the optical sensor device includes a camera, and the data stream comprises video data.

9. The system gateway of claim 7, wherein the data stream comprises analog data, and the operations further comprise:
converting the analog data of the data stream to digital data; and
determining the size of the data packets based on the digital data.

10. The system gateway of claim 7, wherein the portion of the data stream is a first portion, and the operations further comprise:
determining that a size of data packets included in a second portion of the data stream is below the threshold value; and
erasing the second portion of the data stream in response to the determining that the size of data packets included in the second portion of the data stream is below the threshold value.

11. The system gateway of claim 7, wherein the optical sensor device is a first sensor device among a plurality of sensor devices, the data stream is a first data stream, and the operations further comprise:
accessing a second data stream generated by a second sensor device from among the plurality of sensor devices; and
generating a composite data stream that comprises the second data stream and the portion of the first data stream.

12. The system gateway of claim 11, wherein the portion of the data stream comprises a timestamp, and the generating the composite data stream includes:
generating a presentation of the composite data stream that comprises the second data stream, and the portion of the first data stream at a position along the composite data stream based on the timestamp.

13. A non-transitory machine-readable storage medium comprising instructions that, when executed by one or more processors of a system gateway implemented within a vehicle, cause the system gateway to perform operations comprising:
accessing, at a system gateway implemented within a vehicle, a data stream generated by an optical sensor device implemented within the vehicle;
recording the data stream within a rolling buffer;
determining a size of data packets included in a portion of the data stream recorded at the rolling buffer;
determining that the size of the data packets included in the portion of the data stream is greater than a threshold value associated with the optical sensor device, the threshold value comprising a minimum data size of the data packets included in the portion of the data stream, the minimum data size based on a static analog data signal generated by the optical sensor; and in response to the determining that the size of the data packets included in the portion of the data stream recorded within the rolling buffer is greater than the minimum data size defined by the threshold value, transmitting the portion of the data stream from the rolling buffer to a database of the system gateway.

14. The non-transitory machine-readable storage medium of claim 13, wherein the optical sensor device includes a camera, and the data stream comprises video data.

15. The non-transitory machine-readable storage medium of claim 13, wherein the data stream comprises analog data, and the operations further comprise:

converting the analog data of the data stream to digital data; and determining the size of the data packets based on the digital data.

16. The non-transitory machine-readable storage medium of claim 13, wherein the portion of the data stream is a first portion, and the operations further comprise:

determining that a size of data packets included in a second portion of the data stream is below the threshold value; and erasing the second portion of the data stream in response to the determining that the size of data packets included in the second portion of the data stream is below the threshold value.

17. The non-transitory machine-readable storage medium of claim 13, wherein the optical sensor device is a first sensor device among a plurality of sensor devices, the data stream is a first data stream, and the operations further comprise:

accessing a second data stream generated by a second sensor device from among the plurality of sensor devices; and generating a composite data stream that comprises the second data stream and the portion of the first data stream.

* * * * *